United States Patent
Tiana et al.

(10) Patent No.: US 9,674,413 B1
(45) Date of Patent: Jun. 6, 2017

(54) VISION SYSTEM AND METHOD HAVING IMPROVED PERFORMANCE AND SOLAR MITIGATION

(71) Applicants: Carlo L. Tiana, Portland, OR (US); Robert D. Brown, Lake Oswego, OR (US); Robert B. Wood, Beaverton, OR (US)

(72) Inventors: Carlo L. Tiana, Portland, OR (US); Robert D. Brown, Lake Oswego, OR (US); Robert B. Wood, Beaverton, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 13/864,991

(22) Filed: Apr. 17, 2013

(51) Int. Cl.
*H04N 5/225* (2006.01)
*H04N 5/232* (2006.01)

(52) U.S. Cl.
CPC ........... *H04N 5/2254* (2013.01); *H04N 5/232* (2013.01); *H04N 5/23212* (2013.01); *H04N 5/23232* (2013.01)

(58) Field of Classification Search
CPC ............... H04N 5/232; H04N 5/23212; H04N 5/23232; H04N 5/2254
USPC .................................................... 348/207.99
See application file for complete search history.

(56) References Cited

U.S. PATENT DOCUMENTS

| | | | |
|---|---|---|---|
| 2,141,884 A | 12/1938 | Sonnefeld | |
| 3,851,303 A | 11/1974 | Muller | |
| 3,885,095 A | 5/1975 | Wolfson et al. | |
| 3,940,204 A | 2/1976 | Withrington | |
| 4,082,432 A | 4/1978 | Kirschner | |
| 4,099,841 A | 7/1978 | Ellis | |
| 4,178,074 A | 12/1979 | Heller | |
| 4,218,111 A | 8/1980 | Withrington et al. | |
| 4,232,943 A | 11/1980 | Rogers | |
| 4,309,070 A | 1/1982 | St. Leger Searle | |
| 4,647,967 A | 3/1987 | Kirschner et al. | |
| 4,711,512 A | 12/1987 | Upatnieks | |
| 4,714,320 A | 12/1987 | Banbury | |
| 4,743,083 A | 5/1988 | Schimpe | |

(Continued)

FOREIGN PATENT DOCUMENTS

| | | |
|---|---|---|
| CN | 101881936 A | 11/2010 |
| DE | 102006003785 A1 * | 1/2006 |

(Continued)

OTHER PUBLICATIONS

Irie, Masahiro, Photochromic diarylethenes for photonic devices, Pure and Applied Chemistry, 1996, pp. 1367-1371, vol. 68, No. 7, IUPAC.

(Continued)

*Primary Examiner* — Abdelaaziz Tissire
(74) *Attorney, Agent, or Firm* — Donna P. Suchy; Daniel M. Barbieri

(57) ABSTRACT

An enhanced vision system can be used on a vehicle such as an aircraft. The vision system includes a lens, a sensor array and a chromic layer disposed between the lens and the sensor array. A method can protect a focal plane array associated with an enhanced vision or other sensor from solar exposure. The method includes providing a focal plane sensor array and providing at least one photochromic layer in front of the focal plane array.

20 Claims, 4 Drawing Sheets

(56) References Cited

U.S. PATENT DOCUMENTS

| | | |
|---|---|---|
| 4,749,256 A | 6/1988 | Bell et al. |
| 4,775,218 A | 10/1988 | Wood et al. |
| 4,854,688 A | 8/1989 | Hayford et al. |
| 4,928,301 A | 5/1990 | Smoot |
| 4,946,245 A | 8/1990 | Chamberlin et al. |
| 5,007,711 A | 4/1991 | Wood et al. |
| 5,035,734 A | 7/1991 | Honkanen et al. |
| 5,076,664 A | 12/1991 | Migozzi |
| 5,079,416 A | 1/1992 | Filipovich |
| 5,117,285 A | 5/1992 | Nelson et al. |
| 5,124,821 A | 6/1992 | Antier et al. |
| 5,148,302 A | 9/1992 | Nagano et al. |
| 5,151,958 A | 9/1992 | Honkanen |
| 5,153,751 A | 10/1992 | Ishikawa et al. |
| 5,159,445 A | 10/1992 | Gitlin et al. |
| 5,160,523 A | 11/1992 | Honkanen et al. |
| 5,183,545 A | 2/1993 | Branca et al. |
| 5,187,597 A | 2/1993 | Kato et al. |
| 5,210,624 A | 5/1993 | Matsumoto et al. |
| 5,218,360 A | 6/1993 | Goetz et al. |
| 5,243,413 A | 9/1993 | Gitlin et al. |
| 5,289,315 A | 2/1994 | Makita et al. |
| 5,295,208 A | 3/1994 | Caulfield et al. |
| 5,303,085 A | 4/1994 | Rallison |
| 5,317,405 A | 5/1994 | Kuriki et al. |
| 5,341,230 A | 8/1994 | Smith |
| 5,351,151 A * | 9/1994 | Levy .................. G02B 3/0043 359/237 |
| 5,359,362 A | 10/1994 | Lewis et al. |
| 5,363,220 A | 11/1994 | Kuwayama et al. |
| 5,369,511 A | 11/1994 | Amos |
| 5,400,069 A | 3/1995 | Braun et al. |
| 5,408,346 A | 4/1995 | Trissel et al. |
| 5,418,584 A | 5/1995 | Larson |
| 5,438,357 A | 8/1995 | McNelley |
| 5,455,693 A | 10/1995 | Wreede et al. |
| 5,471,326 A | 11/1995 | Hall et al. |
| 5,473,222 A | 12/1995 | Thoeny et al. |
| 5,496,621 A | 3/1996 | Makita et al. |
| 5,500,671 A | 3/1996 | Andersson et al. |
| 5,510,913 A | 4/1996 | Hashimoto et al. |
| 5,515,184 A | 5/1996 | Caulfield et al. |
| 5,524,272 A | 6/1996 | Podowski et al. |
| 5,532,736 A | 7/1996 | Kuriki et al. |
| 5,537,232 A | 7/1996 | Biles |
| 5,572,248 A | 11/1996 | Allen et al. |
| 5,579,026 A | 11/1996 | Tabata |
| 5,604,611 A | 2/1997 | Saburi et al. |
| 5,606,433 A | 2/1997 | Yin et al. |
| 5,612,733 A | 3/1997 | Flohr |
| 5,612,734 A | 3/1997 | Nelson et al. |
| 5,619,254 A | 4/1997 | McNelley |
| 5,629,259 A | 5/1997 | Akada et al. |
| 5,631,107 A | 5/1997 | Tarumi et al. |
| 5,633,100 A | 5/1997 | Mickish et al. |
| 5,646,785 A | 7/1997 | Gilboa et al. |
| 5,648,857 A | 7/1997 | Ando et al. |
| 5,661,577 A | 8/1997 | Jenkins et al. |
| 5,661,603 A | 8/1997 | Hanano et al. |
| 5,665,494 A | 9/1997 | Kawabata et al. |
| 5,668,907 A | 9/1997 | Veligdan |
| 5,682,255 A | 10/1997 | Friesem et al. |
| 5,694,230 A | 12/1997 | Welch |
| 5,701,132 A | 12/1997 | Kollin et al. |
| 5,706,108 A | 1/1998 | Ando et al. |
| 5,707,925 A | 1/1998 | Akada et al. |
| 5,724,189 A | 3/1998 | Ferrante |
| 5,726,782 A | 3/1998 | Kato et al. |
| 5,727,098 A | 3/1998 | Jacobson |
| 5,729,242 A | 3/1998 | Margerum et al. |
| 5,731,060 A | 3/1998 | Hirukawa et al. |
| 5,731,853 A | 3/1998 | Taketomi et al. |
| 5,742,262 A | 4/1998 | Tabata et al. |
| 5,751,452 A | 5/1998 | Tanaka et al. |
| 5,760,931 A | 6/1998 | Saburi et al. |
| 5,764,414 A | 6/1998 | King et al. |
| 5,790,288 A | 8/1998 | Jager et al. |
| 5,812,608 A | 9/1998 | Valimaki et al. |
| 5,822,127 A | 10/1998 | Chen et al. |
| 5,841,507 A | 11/1998 | Barnes |
| 5,856,842 A | 1/1999 | Tedesco |
| 5,868,951 A | 2/1999 | Schuck et al. |
| 5,892,598 A | 4/1999 | Asakawa et al. |
| 5,898,511 A | 4/1999 | Mizutani et al. |
| 5,903,395 A | 5/1999 | Rallison et al. |
| 5,907,416 A | 5/1999 | Hegg et al. |
| 5,907,436 A | 5/1999 | Perry et al. |
| 5,917,459 A | 6/1999 | Son et al. |
| 5,926,147 A | 7/1999 | Sehm et al. |
| 5,929,946 A | 7/1999 | Sharp et al. |
| 5,937,115 A | 8/1999 | Domash |
| 5,942,157 A | 8/1999 | Sutherland et al. |
| 5,945,893 A | 8/1999 | Plessky et al. |
| 5,949,302 A | 9/1999 | Sarkka |
| 5,966,223 A | 10/1999 | Friesem et al. |
| 5,985,422 A | 11/1999 | Krauter |
| 5,991,087 A | 11/1999 | Rallison |
| 5,999,314 A | 12/1999 | Asakura et al. |
| 6,042,947 A | 3/2000 | Asakura et al. |
| 6,043,585 A | 3/2000 | Plessky et al. |
| 6,075,626 A | 6/2000 | Mizutani et al. |
| 6,078,427 A | 6/2000 | Fontaine et al. |
| 6,115,152 A | 9/2000 | Popovich et al. |
| 6,127,066 A | 10/2000 | Ueda et al. |
| 6,137,630 A | 10/2000 | Tsou et al. |
| 6,169,613 B1 | 1/2001 | Amitai et al. |
| 6,176,837 B1 | 1/2001 | Foxlin |
| 6,195,206 B1 | 2/2001 | Yona et al. |
| 6,222,675 B1 | 4/2001 | Mall et al. |
| 6,222,971 B1 | 4/2001 | Veligdan et al. |
| 6,249,386 B1 | 6/2001 | Yona et al. |
| 6,259,423 B1 | 7/2001 | Tokito et al. |
| 6,259,559 B1 | 7/2001 | Kobayashi et al. |
| 6,317,083 B1 | 11/2001 | Johnson et al. |
| 6,317,227 B1 | 11/2001 | Mizutani et al. |
| 6,321,069 B1 | 11/2001 | Piirainen |
| 6,327,089 B1 | 12/2001 | Hosaki et al. |
| 6,333,819 B1 | 12/2001 | Svedenkrans |
| 6,340,540 B1 | 1/2002 | Ueda et al. |
| 6,351,333 B2 | 2/2002 | Araki et al. |
| 6,356,172 B1 | 3/2002 | Koivisto et al. |
| 6,359,730 B2 | 3/2002 | Tervonen |
| 6,359,737 B1 | 3/2002 | Stringfellow |
| 6,366,378 B1 | 4/2002 | Tervonen et al. |
| 6,392,812 B1 | 5/2002 | Howard |
| 6,409,687 B1 | 6/2002 | Foxlin |
| 6,470,132 B1 | 10/2002 | Nousiainen et al. |
| 6,486,997 B1 | 11/2002 | Bruzzone et al. |
| 6,504,518 B1 | 1/2003 | Kuwayama et al. |
| 6,524,771 B2 | 2/2003 | Maeda et al. |
| 6,545,778 B2 | 4/2003 | Ono et al. |
| 6,550,949 B1 | 4/2003 | Bauer et al. |
| 6,557,413 B2 | 5/2003 | Nieminen et al. |
| 6,580,529 B1 | 6/2003 | Amitai et al. |
| 6,583,873 B1 | 6/2003 | Goncharov et al. |
| 6,587,619 B1 | 7/2003 | Kinoshita |
| 6,598,987 B1 | 7/2003 | Parikka |
| 6,608,720 B1 | 8/2003 | Freeman |
| 6,611,253 B1 | 8/2003 | Cohen |
| 6,646,810 B2 | 11/2003 | Harter et al. |
| 6,661,578 B2 | 12/2003 | Hedrick |
| 6,674,578 B2 | 1/2004 | Sugiyama et al. |
| 6,686,815 B1 | 2/2004 | Mirshekarl-Syahkal et al. |
| 6,721,096 B2 | 4/2004 | Bruzzone et al. |
| 6,741,189 B1 | 5/2004 | Gibbons, II et al. |
| 6,744,478 B1 | 6/2004 | Asakura et al. |
| 6,748,342 B1 | 6/2004 | Dickhaus |
| 6,750,941 B2 | 6/2004 | Satoh et al. |
| 6,757,105 B2 | 6/2004 | Niv et al. |
| 6,771,403 B1 | 8/2004 | Endo et al. |
| 6,776,339 B2 | 8/2004 | Piikivi |
| 6,781,701 B1 | 8/2004 | Sweetser et al. |
| 6,805,490 B2 | 10/2004 | Levola |
| 6,825,987 B2 | 11/2004 | Repetto et al. |

(56) References Cited

U.S. PATENT DOCUMENTS

| | | |
|---|---|---|
| 6,829,095 B2 | 12/2004 | Amitai |
| 6,833,955 B2 | 12/2004 | Niv |
| 6,836,369 B2 | 12/2004 | Fujikawa et al. |
| 6,844,212 B2 | 1/2005 | Bond et al. |
| 6,844,980 B2 | 1/2005 | He et al. |
| 6,847,274 B2 | 1/2005 | Salmela et al. |
| 6,847,488 B2 | 1/2005 | Travis |
| 6,853,491 B1 | 2/2005 | Ruhle et al. |
| 6,864,861 B2 | 3/2005 | Schehrer et al. |
| 6,864,927 B1 | 3/2005 | Cathey |
| 6,885,483 B2 | 4/2005 | Takada |
| 6,903,872 B2 | 6/2005 | Schrader |
| 6,909,345 B1 | 6/2005 | Salmela et al. |
| 6,917,375 B2 | 7/2005 | Akada et al. |
| 6,922,267 B2 | 7/2005 | Endo et al. |
| 6,926,429 B2 | 8/2005 | Barlow et al. |
| 6,940,361 B1 | 9/2005 | Jokio et al. |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,958,662 B1 | 10/2005 | Salmela et al. |
| 6,987,908 B2 | 1/2006 | Bond et al. |
| 7,003,187 B2 | 2/2006 | Frick et al. |
| 7,018,744 B2 | 3/2006 | Otaki et al. |
| 7,021,777 B2 | 4/2006 | Amitai |
| 7,026,892 B2 | 4/2006 | Kajiya |
| 7,027,671 B2 | 4/2006 | Huck et al. |
| 7,034,748 B2 | 4/2006 | Kajiya |
| 7,053,735 B2 | 5/2006 | Salmela et al. |
| 7,058,434 B2 | 6/2006 | Wang et al. |
| 7,095,562 B1 | 8/2006 | Peng et al. |
| 7,101,048 B2 | 9/2006 | Travis |
| 7,110,184 B1 | 9/2006 | Yona et al. |
| 7,123,418 B2 | 10/2006 | Weber et al. |
| 7,126,418 B2 | 10/2006 | Hunton et al. |
| 7,126,583 B1 | 10/2006 | Breed |
| 7,132,200 B1 | 11/2006 | Ueda et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,181,105 B2 | 2/2007 | Teramura et al. |
| 7,181,108 B2 | 2/2007 | Levola |
| 7,184,615 B2 | 2/2007 | Levola |
| 7,190,849 B2 | 3/2007 | Katase |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,230,767 B2 | 6/2007 | Walck et al. |
| 7,242,527 B2 | 7/2007 | Spitzer et al. |
| 7,248,128 B2 | 7/2007 | Mattila et al. |
| 7,259,906 B1 | 8/2007 | Islam |
| 7,268,946 B2 | 9/2007 | Wang |
| 7,285,903 B2 | 10/2007 | Cull et al. |
| 7,289,069 B2 | 10/2007 | Ranta |
| 7,299,983 B2 | 11/2007 | Piikivi |
| 7,313,291 B2 | 12/2007 | Okhotnikov et al. |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,375,870 B2 | 5/2008 | Schorpp |
| 7,391,573 B2 | 6/2008 | Amitai |
| 7,394,865 B2 | 7/2008 | Borran et al. |
| 7,395,181 B2 | 7/2008 | Foxlin |
| 7,397,606 B1 | 7/2008 | Peng et al. |
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,415,173 B2 | 8/2008 | Kassamakov et al. |
| 7,418,170 B2 | 8/2008 | Mukawa et al. |
| 7,433,116 B1 | 10/2008 | Islam |
| 7,436,568 B1 | 10/2008 | Kuykendall, Jr. |
| 7,454,103 B2 | 11/2008 | Parriaux |
| 7,457,040 B2 | 11/2008 | Amitai |
| 7,466,994 B2 | 12/2008 | Pihlaja et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,500,104 B2 | 3/2009 | Goland |
| 7,528,385 B2 | 5/2009 | Volodin et al. |
| 7,545,429 B2 | 6/2009 | Travis |
| 7,550,234 B2 | 6/2009 | Otaki et al. |
| 7,567,372 B2 | 7/2009 | Schorpp |
| 7,570,429 B2 | 8/2009 | Maliah et al. |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,588,863 B2 | 9/2009 | Takizawa et al. |
| 7,589,900 B1 | 9/2009 | Powell |
| 7,589,901 B2 | 9/2009 | DeJong et al. |
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,616,270 B2 | 11/2009 | Hirabayashi et al. |
| 7,618,750 B2 | 11/2009 | Ueda et al. |
| 7,629,086 B2 | 12/2009 | Otaki et al. |
| 7,639,911 B2 | 12/2009 | Lee et al. |
| 7,643,214 B2 | 1/2010 | Amitai |
| 7,660,047 B1 | 2/2010 | Travis et al. |
| 7,672,055 B2 | 3/2010 | Amitai |
| 7,710,654 B2 | 5/2010 | Ashkenazi et al. |
| 7,724,441 B2 | 5/2010 | Amitai |
| 7,724,442 B2 | 5/2010 | Amitai |
| 7,724,443 B2 | 5/2010 | Amitai |
| 7,733,572 B1 | 6/2010 | Brown et al. |
| 7,747,113 B2 | 6/2010 | Mukawa et al. |
| 7,751,122 B2 | 7/2010 | Amitai |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,847,235 B2 | 12/2010 | Krupkin et al. |
| 7,864,427 B2 | 1/2011 | Korenaga et al. |
| 7,865,080 B2 | 1/2011 | Hecker et al. |
| 7,872,804 B2 | 1/2011 | Moon et al. |
| 7,884,985 B2 | 2/2011 | Amitai et al. |
| 7,887,186 B2 | 2/2011 | Watanabe |
| 7,903,921 B2 | 3/2011 | Ostergard |
| 7,907,342 B2 | 3/2011 | Simmonds et al. |
| 7,920,787 B2 | 4/2011 | Gentner et al. |
| 7,944,428 B2 | 5/2011 | Travis |
| 7,969,644 B2 | 6/2011 | Tilleman et al. |
| 7,970,246 B2 | 6/2011 | Travis et al. |
| 7,976,208 B2 | 7/2011 | Travis |
| 7,999,982 B2 | 8/2011 | Endo et al. |
| 8,000,491 B2 | 8/2011 | Brodkin et al. |
| 8,004,765 B2 | 8/2011 | Amitai |
| 8,016,475 B2 | 9/2011 | Travis |
| 8,022,942 B2 | 9/2011 | Bathiche et al. |
| RE42,992 E | 12/2011 | David |
| 8,079,713 B2 | 12/2011 | Ashkenazi |
| 8,082,222 B2 | 12/2011 | Rangarajan et al. |
| 8,086,030 B2 | 12/2011 | Gordon et al. |
| 8,089,568 B1 | 1/2012 | Brown et al. |
| 8,107,023 B2 | 1/2012 | Simmonds et al. |
| 8,107,780 B2 | 1/2012 | Simmonds |
| 8,132,948 B2 | 3/2012 | Owen et al. |
| 8,132,976 B2 | 3/2012 | Odell et al. |
| 8,136,690 B2 | 3/2012 | Fang et al. |
| 8,137,981 B2 | 3/2012 | Andrew et al. |
| 8,149,086 B2 | 4/2012 | Klein et al. |

(56) References Cited

U.S. PATENT DOCUMENTS

| | | | |
|---|---|---|---|
| 8,152,315 B2 | 4/2012 | Travis et al. | |
| 8,155,489 B2 | 4/2012 | Saarikko et al. | |
| 8,160,409 B2 | 4/2012 | Large | |
| 8,160,411 B2 | 4/2012 | Levola et al. | |
| 8,186,874 B2 | 5/2012 | Sinbar et al. | |
| 8,188,925 B2 | 5/2012 | Dejean | |
| 8,189,263 B1 | 5/2012 | Wang et al. | |
| 8,189,973 B2 | 5/2012 | Travis et al. | |
| 8,199,803 B2 | 6/2012 | Hauske et al. | |
| 8,213,065 B2 | 7/2012 | Mukawa | |
| 8,233,204 B1 | 7/2012 | Robbins et al. | |
| 8,253,914 B2 | 8/2012 | Kajiya et al. | |
| 8,254,031 B2 | 8/2012 | Levola | |
| 8,295,710 B2 | 10/2012 | Marcus | |
| 8,301,031 B2 | 10/2012 | Gentner et al. | |
| 8,305,577 B2 | 11/2012 | Kivioja et al. | |
| 8,306,423 B2 | 11/2012 | Gottwald et al. | |
| 8,314,819 B2 | 11/2012 | Kimmel et al. | |
| 8,321,810 B2 | 11/2012 | Heintze | |
| 8,335,040 B2 | 12/2012 | Mukawa et al. | |
| 8,351,744 B2 | 1/2013 | Travis et al. | |
| 8,354,806 B2 | 1/2013 | Travis et al. | |
| 8,355,610 B2 | 1/2013 | Simmonds | |
| 8,369,019 B2 | 2/2013 | Baker et al. | |
| 8,384,694 B2 | 2/2013 | Powell et al. | |
| 8,398,242 B2 | 3/2013 | Yamamoto et al. | |
| 8,403,490 B2 | 3/2013 | Sugiyama et al. | |
| 8,422,840 B2 | 4/2013 | Large | |
| 8,427,439 B2 | 4/2013 | Larsen et al. | |
| 8,432,363 B2 | 4/2013 | Saarikko et al. | |
| 8,432,372 B2 | 4/2013 | Butler et al. | |
| 8,472,119 B1 | 6/2013 | Kelly | |
| 8,477,261 B2 | 7/2013 | Travis et al. | |
| 8,491,121 B2 | 7/2013 | Tilleman et al. | |
| 8,491,136 B2 | 7/2013 | Travis et al. | |
| 8,493,366 B2 | 7/2013 | Bathiche et al. | |
| 8,493,662 B2 | 7/2013 | Noui | |
| 8,508,848 B2 | 8/2013 | Saarikko | |
| 8,547,638 B2 | 10/2013 | Levola | |
| 8,578,038 B2 | 11/2013 | Kaikuranta et al. | |
| 8,581,831 B2 | 11/2013 | Travis | |
| 8,582,206 B2 | 11/2013 | Travis | |
| 8,593,734 B2 | 11/2013 | Laakkonen | |
| 8,611,014 B2 | 12/2013 | Valera et al. | |
| 8,619,062 B2 | 12/2013 | Powell et al. | |
| 8,633,786 B2 | 1/2014 | Ermolov et al. | |
| 8,639,072 B2 | 1/2014 | Popovich et al. | |
| 8,643,691 B2 | 2/2014 | Rosenfeld et al. | |
| 8,649,099 B2 | 2/2014 | Schultz et al. | |
| 8,654,420 B2 | 2/2014 | Simmonds | |
| 8,670,029 B2 | 3/2014 | McEldowney | |
| 8,693,087 B2 | 4/2014 | Nowatzyk et al. | |
| 8,736,802 B2 | 5/2014 | Kajiya et al. | |
| 8,736,963 B2 | 5/2014 | Robbins et al. | |
| 8,767,294 B2 | 7/2014 | Chen et al. | |
| 8,810,600 B2 | 8/2014 | Bohn et al. | |
| 8,814,691 B2 | 8/2014 | Haddick et al. | |
| 8,830,584 B2 | 9/2014 | Saarikko et al. | |
| 8,913,324 B2 | 12/2014 | Schrader | |
| 8,938,141 B2 | 1/2015 | Magnusson | |
| 2002/0012064 A1* | 1/2002 | Yamaguchi | H04N 5/2254 348/362 |
| 2002/0021461 A1 | 2/2002 | Ono et al. | |
| 2002/0131175 A1 | 9/2002 | Yagi et al. | |
| 2003/0039442 A1 | 2/2003 | Bond et al. | |
| 2003/0063042 A1 | 4/2003 | Friesem et al. | |
| 2003/0149346 A1 | 8/2003 | Arnone et al. | |
| 2003/0228019 A1 | 12/2003 | Eichler et al. | |
| 2004/0089842 A1 | 5/2004 | Sutehrland et al. | |
| 2004/0188617 A1* | 9/2004 | Devitt | G01J 1/04 250/338.1 |
| 2004/0208446 A1 | 10/2004 | Bond et al. | |
| 2004/0208466 A1 | 10/2004 | Mossberg et al. | |
| 2005/0135747 A1 | 6/2005 | Greiner et al. | |
| 2005/0136260 A1* | 6/2005 | Garcia | B32B 7/02 428/411.1 |
| 2005/0259302 A9 | 11/2005 | Metz et al. | |
| 2005/0269481 A1 | 12/2005 | David et al. | |
| 2006/0093793 A1 | 5/2006 | Miyakawa et al. | |
| 2006/0114564 A1 | 6/2006 | Sutherland et al. | |
| 2006/0119916 A1 | 6/2006 | Sutherland et al. | |
| 2006/0132914 A1 | 6/2006 | Weiss et al. | |
| 2006/0221448 A1 | 10/2006 | Nivon et al. | |
| 2006/0228073 A1 | 10/2006 | Mukawa et al. | |
| 2006/0279662 A1 | 12/2006 | Kapellner et al. | |
| 2007/0019152 A1 | 1/2007 | Caputo et al. | |
| 2007/0019297 A1 | 1/2007 | Stewart et al. | |
| 2007/0041684 A1 | 2/2007 | Popovich et al. | |
| 2007/0045596 A1* | 3/2007 | King | C08J 7/047 252/582 |
| 2007/0089625 A1 | 4/2007 | Grinberg et al. | |
| 2007/0133920 A1 | 6/2007 | Lee et al. | |
| 2007/0133983 A1* | 6/2007 | Traff | G02B 5/23 396/506 |
| 2007/0188837 A1 | 8/2007 | Shimizu et al. | |
| 2007/0211164 A1* | 9/2007 | Olsen | G02B 3/0062 348/345 |
| 2008/0043334 A1 | 2/2008 | Itzkovitch et al. | |
| 2008/0106775 A1 | 5/2008 | Amitai et al. | |
| 2008/0136923 A1 | 6/2008 | Inbar et al. | |
| 2008/0151379 A1 | 6/2008 | Amitai | |
| 2008/0186604 A1 | 8/2008 | Amitai | |
| 2008/0198471 A1 | 8/2008 | Amitai | |
| 2008/0278812 A1 | 11/2008 | Amitai | |
| 2008/0285140 A1 | 11/2008 | Amitai | |
| 2008/0309586 A1 | 12/2008 | Vitale | |
| 2009/0017424 A1 | 1/2009 | Yoeli et al. | |
| 2009/0019222 A1 | 1/2009 | Verma et al. | |
| 2009/0052046 A1 | 2/2009 | Amitai | |
| 2009/0052047 A1 | 2/2009 | Amitai | |
| 2009/0067774 A1 | 3/2009 | Magnusson | |
| 2009/0097122 A1 | 4/2009 | Niv | |
| 2009/0097127 A1 | 4/2009 | Amitai | |
| 2009/0121301 A1* | 5/2009 | Chang | G02B 5/23 257/432 |
| 2009/0122413 A1 | 5/2009 | Hoffman et al. | |
| 2009/0122414 A1 | 5/2009 | Amitai | |
| 2009/0128902 A1 | 5/2009 | Niv et al. | |
| 2009/0128911 A1 | 5/2009 | Itzkovitch et al. | |
| 2009/0153437 A1 | 6/2009 | Aharoni | |
| 2009/0190222 A1 | 7/2009 | Simmonds et al. | |
| 2009/0213208 A1 | 8/2009 | Glatt | |
| 2009/0237804 A1 | 9/2009 | Amitai et al. | |
| 2009/0303599 A1 | 12/2009 | Levola | |
| 2009/0316246 A1* | 12/2009 | Asai | B29D 11/0073 359/241 |
| 2010/0039796 A1 | 2/2010 | Mukawa | |
| 2010/0060551 A1 | 3/2010 | Sugiyama et al. | |
| 2010/0060990 A1 | 3/2010 | Wertheim et al. | |
| 2010/0079865 A1 | 4/2010 | Saarikko et al. | |
| 2010/0092124 A1 | 4/2010 | Magnusson et al. | |
| 2010/0096562 A1 | 4/2010 | Klunder et al. | |
| 2010/0103078 A1 | 4/2010 | Mukawa et al. | |
| 2010/0136319 A1 | 6/2010 | Imai et al. | |
| 2010/0141555 A1 | 6/2010 | Rorberg et al. | |
| 2010/0165465 A1 | 7/2010 | Levola | |
| 2010/0171680 A1 | 7/2010 | Lapidot et al. | |
| 2010/0177388 A1 | 7/2010 | Cohen et al. | |
| 2010/0214659 A1 | 8/2010 | Levola | |
| 2010/0231693 A1 | 9/2010 | Levola | |
| 2010/0231705 A1 | 9/2010 | Yahav et al. | |
| 2010/0232003 A1* | 9/2010 | Baldy | G02C 7/12 359/243 |
| 2010/0246004 A1 | 9/2010 | Simmonds | |
| 2010/0246993 A1 | 9/2010 | Rieger et al. | |
| 2010/0265117 A1 | 10/2010 | Weiss | |
| 2010/0277803 A1 | 11/2010 | Pockett et al. | |
| 2010/0284085 A1 | 11/2010 | Laakkonen | |
| 2010/0296163 A1 | 11/2010 | Saarikko | |
| 2010/0315719 A1 | 12/2010 | Saarikko et al. | |
| 2010/0321781 A1 | 12/2010 | Levola et al. | |
| 2011/0019250 A1 | 1/2011 | Aiki et al. | |
| 2011/0019874 A1 | 1/2011 | Jarvenpaa et al. | |

(56) References Cited

U.S. PATENT DOCUMENTS

| | | | |
|---|---|---|---|
| 2011/0026128 A1 | 2/2011 | Baker et al. | |
| 2011/0026774 A1 | 2/2011 | Flohr et al. | |
| 2011/0038024 A1* | 2/2011 | Wang | G02B 5/23 |
| | | | 359/241 |
| 2011/0050548 A1 | 3/2011 | Blumenfeld et al. | |
| 2011/0096401 A1 | 4/2011 | Levola | |
| 2011/0157707 A1 | 6/2011 | Tilleman et al. | |
| 2011/0164221 A1 | 7/2011 | Tilleman et al. | |
| 2011/0211239 A1 | 9/2011 | Mukawa et al. | |
| 2011/0235179 A1 | 9/2011 | Simmonds | |
| 2011/0238399 A1 | 9/2011 | Ophir et al. | |
| 2011/0242349 A1* | 10/2011 | Izuha | H01L 27/14621 |
| | | | 348/222.1 |
| 2011/0242661 A1 | 10/2011 | Simmonds | |
| 2011/0242670 A1 | 10/2011 | Simmonds | |
| 2011/0310356 A1 | 12/2011 | Vallius | |
| 2012/0007979 A1 | 1/2012 | Schneider et al. | |
| 2012/0033306 A1 | 2/2012 | Valera et al. | |
| 2012/0044572 A1 | 2/2012 | Simmonds et al. | |
| 2012/0044573 A1 | 2/2012 | Simmonds et al. | |
| 2012/0062850 A1 | 3/2012 | Travis | |
| 2012/0099203 A1 | 4/2012 | Boubis et al. | |
| 2012/0105634 A1 | 5/2012 | Meidan et al. | |
| 2012/0120493 A1 | 5/2012 | Simmonds et al. | |
| 2012/0127577 A1 | 5/2012 | Desserouer | |
| 2012/0224062 A1 | 9/2012 | Lacoste et al. | |
| 2012/0235884 A1* | 9/2012 | Miller | G02B 27/0093 |
| | | | 345/8 |
| 2012/0235900 A1 | 9/2012 | Border et al. | |
| 2012/0242661 A1 | 9/2012 | Takagi et al. | |
| 2012/0280956 A1 | 11/2012 | Yamamoto et al. | |
| 2012/0300311 A1 | 11/2012 | Simmonds et al. | |
| 2012/0320460 A1 | 12/2012 | Levola | |
| 2013/0069850 A1 | 3/2013 | Mukawa et al. | |
| 2013/0093893 A1 | 4/2013 | Schofield | |
| 2013/0101253 A1 | 4/2013 | Popovich et al. | |
| 2013/0138275 A1 | 5/2013 | Nauman et al. | |
| 2013/0141937 A1 | 6/2013 | Katsuta et al. | |
| 2013/0170031 A1 | 7/2013 | Bohn et al. | |
| 2013/0200710 A1 | 8/2013 | Robbins | |
| 2013/0249895 A1 | 9/2013 | Westerinen et al. | |
| 2013/0257848 A1 | 10/2013 | Westerinen et al. | |
| 2013/0258701 A1 | 10/2013 | Westerinen et al. | |
| 2013/0314793 A1 | 11/2013 | Robbins et al. | |
| 2013/0322810 A1 | 12/2013 | Robbins | |
| 2013/0328948 A1* | 12/2013 | Kunkel | G09G 3/22 |
| | | | 345/690 |
| 2014/0104665 A1 | 4/2014 | Popovich et al. | |
| 2014/0104685 A1 | 4/2014 | Bohn et al. | |
| 2014/0140653 A1 | 5/2014 | Brown et al. | |
| 2014/0140654 A1 | 5/2014 | Brown et al. | |
| 2014/0146394 A1 | 5/2014 | Tout et al. | |
| 2014/0152778 A1 | 6/2014 | Ihlenburg et al. | |
| 2014/0168055 A1 | 6/2014 | Smith | |
| 2014/0168260 A1 | 6/2014 | O'Brien et al. | |
| 2014/0168735 A1 | 6/2014 | Yuan et al. | |
| 2014/0172296 A1 | 6/2014 | Shtukater | |
| 2014/0176528 A1 | 6/2014 | Robbins | |
| 2014/0204455 A1 | 7/2014 | Popovich et al. | |
| 2014/0211322 A1 | 7/2014 | Bohn et al. | |
| 2014/0218801 A1 | 8/2014 | Simmonds et al. | |
| 2015/0010265 A1 | 1/2015 | Popovich et al. | |
| 2015/0289762 A1 | 10/2015 | Popovich et al. | |

FOREIGN PATENT DOCUMENTS

| | | |
|---|---|---|
| EP | 0 822 441 | 2/1998 |
| EP | 2 110 701 | 10/2009 |
| EP | 2 225 592 | 9/2010 |
| EP | 2 381 290 | 10/2011 |
| EP | 2 733 517 | 5/2014 |
| FR | 2677463 | 12/1992 |
| GB | 2 115 178 A | 9/1983 |
| JP | 2004-157245 | 6/2004 |
| WO | WO-99/52002 | 10/1999 |
| WO | WO-03/081320 A1 | 10/2003 |
| WO | WO-2006/002870 | 1/2006 |
| WO | WO-2007/130130 A2 | 11/2007 |
| WO | WO-2007/130130 A3 | 11/2007 |
| WO | WO-2009/013597 A2 | 1/2009 |
| WO | WO-2009/077802 | 6/2009 |
| WO | WO-2010/067114 | 6/2010 |
| WO | WO-2010/067117 | 6/2010 |
| WO | WO-2010/125337 A2 | 11/2010 |
| WO | WO-2010/125337 A3 | 11/2010 |
| WO | WO-2011/012825 | 2/2011 |
| WO | WO-2011/051660 A1 | 5/2011 |
| WO | WO-2011/055109 A2 | 5/2011 |
| WO | WO-2011/107831 | 9/2011 |
| WO | WO-2013/027006 A1 | 2/2013 |
| WO | WO-2013/033274 A1 | 3/2013 |
| WO | WO-2013/163347 | 10/2013 |
| WO | WO-2014/091200 | 6/2014 |

OTHER PUBLICATIONS

Plastic has replaced glass in photochromic lens, www.plastemart.com, 2003, 1 page.

Ayras et al., Exit Pupil Expander with a Large Field of View Based on Diffractive Optics, Journal of the SID, 2009, 6 pages.

Cameron, A., The Application of Holographic Optical Waveguide Technology to Q-Sight Family of Helmet Mounted Displays, Proc. of SPIE, vol. 7326, 7326OH-1, 2009, 11 pages.

Final Office Action on U.S. Appl. No. 13/250,940 Dated Oct. 17, 2014, 15 pages.

Non-Final Office Action on U.S. Appl. No. 13/250,858 Dated Sep. 15, 2014, 16 pages.

Notice of Allowance for U.S. Appl. No. 12/700,557, mail date Oct. 22, 2013, 9 pages.

Notice of Allowance on U.S. Appl. No. 13/250,970 dated Sep. 16, 2014, 7 pages.

Notice of Allowance on U.S. Appl. No. 13/251,087 Dated Jul. 17, 2014, 8 pages.

Office Action for U.S. Appl. No. 12/700,557, mail date Aug. 9, 2013, 12 pages.

Office Action for U.S. Appl. No. 12/700,557, mail date Feb. 4, 2013, 11 pages.

Office Action for U.S. Appl. No. 13/250,621, mail date May 21, 2013, 10 pages.

Office Action for U.S. Appl. No. 13/250,858 Dated Feb. 19, 2014, 13 page.

Office Action for U.S. Appl. No. 13/250,858, mail date Oct. 28, 2013, 9 pages.

Office Action for U.S. Appl. No. 13/250,940, mail date Aug. 28, 2013, 15 pages.

Office Action for U.S. Appl. No. 13/250,940, mail date Mar. 12, 2013, 11 pages.

Office Action for U.S. Appl. No. 13/250,970, mail date Jul. 30, 2013, 4 pages.

Office Action for U.S. Appl. No. 13/250,994, mail date Sep. 16, 2013, 11 pages.

Office Action on U.S. Appl. No. 13/250,940 Dated Mar. 25, 2014, 12 pages.

Office Action on U.S. Appl. No. 13/251,087 Dated Mar. 28, 2014, 12 pages.

Webster's Third New International Dictionary 433 (1986), 3 pages.

Wisely, P.L., Head up and head mounted display performance improvements through advanced techniques in the manipulation of light, Proc. of SPIE vol. 7327, 732706-1, 2009, 10 pages.

Office Action on U.S. Appl. No. 13/892,026 Dated Dec. 8, 2014, 19 pages.

Office Action on U.S. Appl. No. 13/892,057 Dated Nov. 28, 2014, 17 pages.

Final Office Action on U.S. Appl. No. 13/250,858 Dated Feb. 4, 2015, 18 pages.

Final Office Action on U.S. Appl. No. 13/892,057 Dated Mar. 5, 2015, 21 pages.

(56) References Cited

OTHER PUBLICATIONS

Non-Final Office Action on U.S. Appl. No. 14/038,400 Dated Feb. 5, 2015, 18 pages.
Final Office Action on U.S. Appl. No. 13/892,026 Dated Apr. 3, 2015, 17 pages.
Non-Final Office Action on U.S. Appl. No. 13/250,940 Dated Mar. 18, 2015, 17 pages.
Amendment and Reply for U.S. Appl. No. 12/571,262, mail date Dec. 16, 2011, 7 pages.
Amitai, Y., et al. "Visor-display design based on planar holographic optics," Applied Optics, vol. 34, No. 8, Mar. 10, 1995, pp. 1352-1356.
Ayras, et al., "Exit pupil expander with a large field of view based on diffractive optics", Journal of the Society for Information Display, 17/8, 2009, pp. 659-664.
Caputo, R. et al., POLICRYPS Switchable Holographic Grating: A Promising Grating Electro-Optical Pixel for High Resolution Display Application; Journal of Display Technology, vol. 2, No. 1, Mar. 2006, pp. 38-51, 14 pages.
Crawford, "Switchable Bragg Gratings", Optics & Photonics News, Apr. 2003, pp. 54-59.
Extended European Search Report for EP Application No. 13192383, dated Apr. 2, 2014, 7 pages.
Final Office Action on U.S. Appl. No. 13/869,866 Dated Oct. 3, 2014, 17 pages.
Final Office Action on U.S. Appl. No. 14/038,400 Dated Aug. 10, 2015, 32 pages.
First office action received in Chinese patent application No. 201380001530.1, dated Jun. 30, 2015, 9 pages with English translation.
International Preliminary Report on Patentability for PCT Application No. PCT/US2013/038070, dated Oct. 28, 2014, 6 pages.
International Search Report and Written Opinion regarding PCT/US2013/038070, mail date Aug. 14, 2013, 14 pages.
Levola, et al., "Replicated slanted gratings with a high refractive index material for in and outcoupling of light" Optics Express, vol. 15, Issue 5, pp. 2067-2074 (2007).
Moffitt, "Head-Mounted Display Image Configurations", retrieved from the internet at http://www.kirkmoffitt.com/hmd_image_configurations.pdf on Dec. 19, 2014, dated May 2008, 25 pages.
Non-Final Office Action on U.S. Appl. No. 13/869,866 Dated Jul. 22, 2015, 28 pages.
Non-Final Office Action on U.S. Appl. No. 13/892,026 Dates Aug. 6, 2015, 22 pages.
Non-Final Office Action on U.S. Appl. No. 13/892,057 dated Jul. 30, 2015, 29 pages.
Non-Final Office Action on U.S. Appl. No. 13/250,858 dated Jun. 12, 2015, 20 pages.
Non-Final Office Action on U.S. Appl. No. 13/432,662 Dated May 27, 2015, 15 pages.
Non-Final Office Action on U.S. Appl. No. 13/844,456 Apr. 1, 2015, 16 Pages.
Non-Final Office Action on U.S. Appl. No. 13/869,866 Dated May 28, 2014, 16 pages.
Non-Final Office Action on U.S. Appl. No. 14/044,676 Dated Apr. 9, 2015, 13 pages.
Non-Final Office Action on U.S. Appl. No. 14/109,551 Dated Jul. 14, 2015, 32 pages.
Non-Final Office Action on U.S. Appl. No. 14/152,756, mail date Aug. 25, 2015, 39 pages.
Non-Final Office Action on U.S. Appl. No. 14/168,173 Dated Jun. 22, 2015, 14 pages.
Non-Final Office Action on U.S. Appl. No. 14/225,062 Dated May 21, 2015, 11 pages.
Nordin, G., et al., "Diffraction properties of stratified volume holographic optical elements," Journal of the Optical Society of America A., vol. 9, No. 12, Dec. 1992, pp. 2206-2217, 12 pages.
Notice of Allowance on U.S. Appl. No. 13/355,360 Dated Apr. 10, 2014, 7 pages.
Office Action for U.S. Appl. No. 12/571,262, mail date Sep. 28, 2011, 5 pages.
Office Action for U.S. Appl. No. 13/355,360, mail date Sep. 12, 2013, 7 pages.
Office Action, U.S. Appl. No. 10/696,507, mailed on Nov. 13, 2008 (CTX-290US), 15 pages.
Press Release, "USAF Awards SBG Labs an SBIR Contract for Wide Field of View HUD", SBG Labs—DigiLens, Apr. 2013, 1 page.
Press Release: "Navy awards SGB Labs a contract for HMDs for simulation and training", Press releases, DigiLens, Oct. 2012, pp. 1-2, retrieved from the internat at http://www.digilens.com/pr10-2012.2.php. 2 pages.
Requirement for Restriction/Election on U.S. Appl. No. 13/844,456 Dated Sep. 12, 2014, 23 pages.
Schechter, et al., "Compact beam expander with linear gratings", Applied Optics, vol. 41, No. 7, Mar. 1, 2002, pp. 1236-1240.
Urey, "Diffractive exit pupil expander for display applications" Applied Optics, vol. 40, Issue 32, pp. 5840-5851 (2001).
Non-Final Office Action issued in U.S. Appl. No. 13/892,057 dated May 16, 2016.
Final Office Action issued in U.S. Appl. No. 14/260,943, dated Jul. 19, 2016.
Final Office Action on U.S. Appl. No. 14/260,943, dated Jul. 19, 2016, 23 pages.
Final Office Action on U.S. Appl. No. 13/892,057 dated Nov. 20, 2015, 30 pages.
Non-Final Office Action on U.S. Appl. No. 13/844,456, dated Jan. 15, 2016, 16 Pages.
Non-Final Office Action on U.S. Appl. No. 14/044,676, dated Jan. 20, 2016, 21 pages.
Non-Final Office Action on U.S. Appl. No. 14/260,943 dated Feb. 3, 2016, 19 pages.
Notice of Allowance on U.S. Appl. No. 13/432,662, dated Feb. 18, 2016, 10 pages.
Notice of Allowance on U.S. Appl. No. 13/892,057, dated Nov. 8, 2016, 10 pages.

* cited by examiner

VISION SYSTEM AND METHOD HAVING IMPROVED PERFORMANCE AND SOLAR MITIGATION

BACKGROUND

The present specification relates generally to the field of electromagnetic sensors used in vision systems.

Vision systems are utilized in a wide variety of applications including, but not limited to, medical, military, avionic, transportation, security, entertainment and computing applications. Vision systems generally include a sensor for sensing images of a target or an environment. For example, in aviation applications, enhanced vision images and remotely sensed images can be provided to a display to augment an operator's view of an environment or target. The enhanced vision image or remotely sensed image is generally provided by sensors disposed outside of the aircraft and directed toward the environment or target.

Sensors used in enhanced vision systems and remote vision systems often include a camera for sensing an image. The camera generally includes a lens and an imager. The imager provides electrical signals or data in response to radiation. The radiation can be visible light, infrared light, or other electromagnetic energy.

Direct sunlight and other bright light sources can cause temporary or permanent damage with respect to the imager and can reduce the quality of the image provided by the imager. For example, the imager can approach saturation at areas exposed to direct sunlight. The saturation of portions of the imager reduce the image quality and/or the dynamic range of the sensor. In addition, direct sunlight and other bright lights can cause extreme photon flux. Extreme photon flux can cause damage onto sensitive visible, infrared or other sensing elements in the imager.

Therefore, there is a need for a system for and method of eliminating or mitigating damage caused by direct sunlight to a sensor in a vision system. Further still, there is a need to expand the dynamic range of an imaging system under normal imaging situations where areas of the imager approach saturation. Further still, there is a need for a sensor which includes material for mitigating the effects of direct sunlight exposure and bright light exposure. There is further a need for an inexpensive, lightweight solution for protecting a vision system camera from bright light and solar exposure.

SUMMARY

An exemplary embodiment relates to an enhanced vision system. The vision system includes a lens, a sensor array and a photochromic layer disposed between the lens and the sensor array.

Another exemplary embodiment relates to method of protecting a focal plane sensor array from solar exposure. The method includes providing a focal plane sensor array and providing at least one photochromic layer in front of the focal plane array.

Another exemplary embodiment relates to a camera. The camera includes a sensor array and a photochromic layer disposed in front of the sensor array.

Yet other exemplary embodiments relate to an enhanced vision system and method used on a vehicle such as an aircraft. The vision system includes a lens, a sensor array and a chromic layer disposed between the lens and the sensor array. The method can protect a focal plane array associated with an enhanced vision or other sensor from solar exposure. The method includes providing a focal plane sensor array and providing at least one photochromic layer in front of the focal plane array.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

Figure 1:
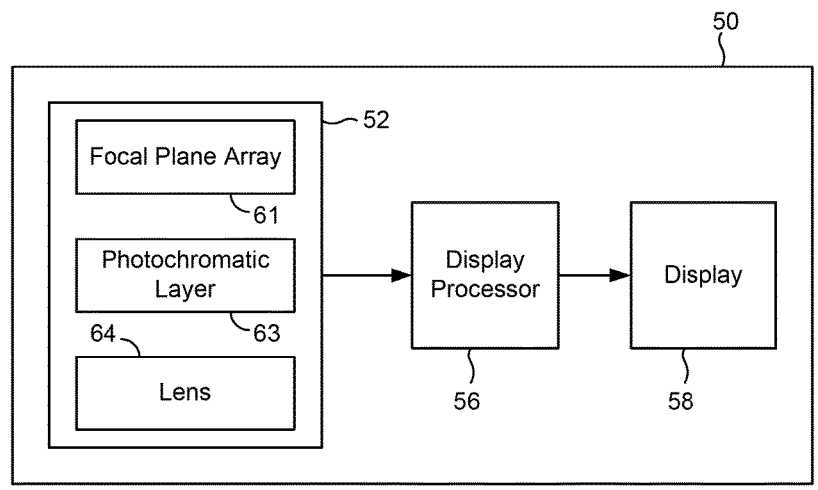
FIG. 1 is a general block diagram of a vision system, according to an exemplary embodiment.

Before describing in detail the particular improved system and method, it should be observed that the invention includes, but is not limited to a novel structural combination of conventional video/data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring to FIG. 1, a vision system 50 can be implemented in a wide variety of applications. Vision system 50 can be an enhanced vision system (EVS), a remote vision system (RVS) or other imaging system. For example, system 50 may be implemented in systems including but not limited to military targeting systems, medical imaging display systems, security systems, navigation systems, remote control systems, land based vehicle HUD, HMD, or head down display systems, naval based vehicle HUD, HMD, or head down display (HDD) systems or aircraft HUD, HMD or HDD systems. Vision system 50 is not limited to use in aircraft environments. Display processor 56 can be coupled to display 58 and provides a display signal or data, such as a video signal, which causes display 58 to show information or content. The information or content includes the sensed image in one embodiment. The sensed image can be fused with other images and with computer generated text, images and symbology.

In one embodiment, vision system 50 includes a sensor 52, a display processor 56 and a display 58. Additional sensors can also be provided. Display processor 56 can be an electronic device, such as hardware, software, or combination thereof suitable for processing sensed images, such as, EVS images or RVS images in one embodiment. Sensor 52 can be a camera configured to detect visible wavelengths, infrared wavelengths, near-infrared radiation, or a combination thereof. System 50 can include two or more sensors like sensor 52. In some embodiments, only a single sensor or camera provides images to system 50.

Display processor 56 is coupled to sensor 52 in one exemplary embodiment. Sensor 52 is an EV sensor, such as, a visible or non-visible light camera, in one embodiment. Sensor 52 can include a sensor array (e.g., a focal plane array) for sensing light or other electromagnetic energy in the environment. Processor 56 can be integrated with or separate from sensor 52 and/or display 58.

Display 58 can be any type of display including light emitting diode (LED) based displays, liquid crystal displays (LCDs), cathode ray tubes (CRTs), etc. Display 58 can be part of other systems and can be a primary flight display, HMD or HUD. The sensed image is provided to the operator/viewer of system 50 in a preferred embodiment.

In one embodiment, sensor 52 includes a focal plane array 61, a photochromic layer 63 and a lens 64. Lens 64 provides light from a target or an environment through photochromic layer 63 to focal plane array 61. Sensor 52 provides data representing the image to processor 56 from focal plane array 61. Array 61 is disposed in the focal plane of lens 64 in one embodiment, lens 64 can be a lens system.

In one embodiment, photochromic layer 63 advantageously mitigates the impact of extreme photon flux on image detectors such as focal plane array 61. For example, solar damage onto sensitive visible, infrared or other elements in focal plane array 61 can be reduced, obscured, or blocked by operation of photochromic layer 63. Photochromic layer 63 is a passive layer in the optical path of focal plane array 61 that reacts to ultraviolet light in one embodiment. As a solar disc or other bright light enters the field of view of sensor 52, layer 63 becomes darker or more opaque at that location due to the ultraviolet light associated with sun exposure.

The operation of layer 63 reduces the intensity of the light reaching array 61. Photochromic layer 63 is preferably configured to have a temporal response in accordance with performance criteria and application parameters. In one embodiment, the response characteristic is relatively rapid in responding and recovering from solar disc exposure in EVS applications. For example, a rapidly responding and rapidly recovering photochromic material for layer 63 can reduce the brightness of near saturation image elements (airport approach lighting systems at night). Layer 63 can have a response and recovery constant that is optimized for given applications. For example, in a security camera application, layer 63 can have a response and recovery time constant that is relatively longer than a response associated with an aircraft system. Response times of photochromic materials can vary widely. Materials with appropriate response times can be chosen depending on the expected environment of the imaging system. For example, in a stationary, ground based, security camera, where the sun might trace a slow arc across the field of view, a slowly responding and slowly recovering photochromic layer might be appropriate, with response time constants in the order of seconds. Modern organic compounds have been demonstrated with very fast response times, for examples in the microsecond or faster range (e.g., photochromic diarylethenes with heterocyclic rings), These would be applicable to a fast moving camera, on an aircraft for example, or for a sensor requiring response to rapidly switching emitters, such as flashes or lasers. Reduction in brightness of near saturating image elements allows system 50 to operate at higher gain, effectively improving dynamic range. System 50 can operate at a higher gain during daytime because layer 63 is more uniformly darkened by ambient light.

Photochromic layer 63 can be heated or cooled, but heating and cooling is not required to adjust recovery and response characteristics based upon the thermal response of the photochromic material. In addition, temperature controls can be used to control the photochromic material transmittance response to light. Generally, with lower the temperatures, faster response and recovery times and higher levels of opaqueness are achieved. A processor (e.g., processor 56) can be used to control heating and/or cooling elements for layer 63.

Photochromic layer 63 can be a number of layers with different response characteristics. Accordingly, layer 63 can be tuned for particular responses depending upon design criteria and system parameters. For example, a first chromic layer can have a response that provides a step-wise transmittance response with greater opacity in response to bright light associated with a solar disk, and a second chromic layer can have a response that provides a transmittance response with less opacity in response to less bright light associated with other types of light sources (man-made light sources). In one embodiment, response of the second layer can be more linear and not achieve the maximum opacity of the first layer. The first chromic layer can be disposed closer to lens 64 than the second chromatic layer. In another embodiment, the second chromic layer can have a faster response than the first chromic layer.

In one embodiment, photochromic layer 63 can be a thin glass or plastic substrate coated with a photochromic dye having a transmittance characteristic inversely proportional to the presence of lights. Alternative passive photochromic materials include materials with responsivity to ultra violet (UV) or intense visible light radiation. Passive photochromic material can include fulgide chemicals, oxazines, naphthopyrans, mercury dithizonate, $CaF_2$ and $SrTiO_3$ photochromic crystals, and others. The specific material is chosen depending on the wavelength spectrum it responds to, and the response characteristics required by the sensor system. The photochromic dye can be deposited by spin coating in one embodiment. In one embodiment, layer 63 has a linear response to the presence of light. In another embodiment, layer 63 has a step wise response to the presence of light, where light associated with near saturation levels causes a large change in transmittance. Photochromic material can have a thickness of a few microns, or 150 microns, or more in one embodiment.

Layer 63 can be tuned for response and recovery from particular wave lengths of light. For example, the layer 63 can be tuned to react to sunlight or frequencies of light associated with airport approach landing systems. Further, a filter can be provided in front of layer 63.

Layer 63 can be comprised of photochromic material (e.g., dye) between two substrates or between a substrate and a substrate associated with array 61.

Although processor 56 is depicted in FIG. 1 as a single unit, a composition of two or more separate processing units can perform the processing functions of processor 56, either in whole or in part. According to one embodiment, vision system 50 can be provided as part of or integrated with other systems associated with the application for system 50. Various processors and devices can be used to control the sensing operation.

Figure 2:
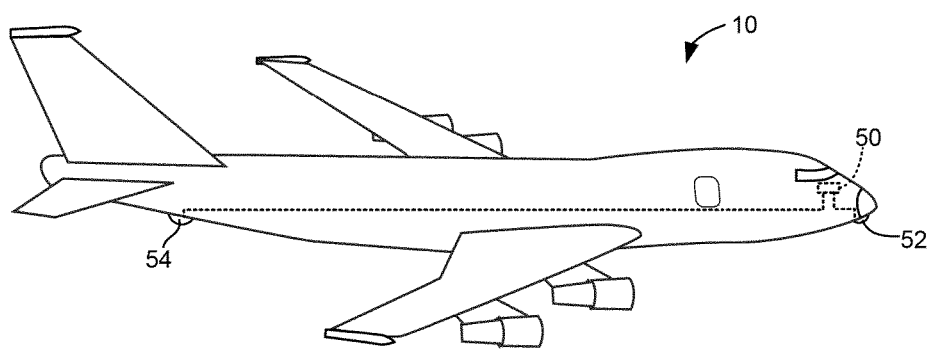
FIG. 2 is a perspective view schematic drawing of an aircraft including the vision system illustrated in FIG. 1 according to an exemplary embodiment.
Figure 3:
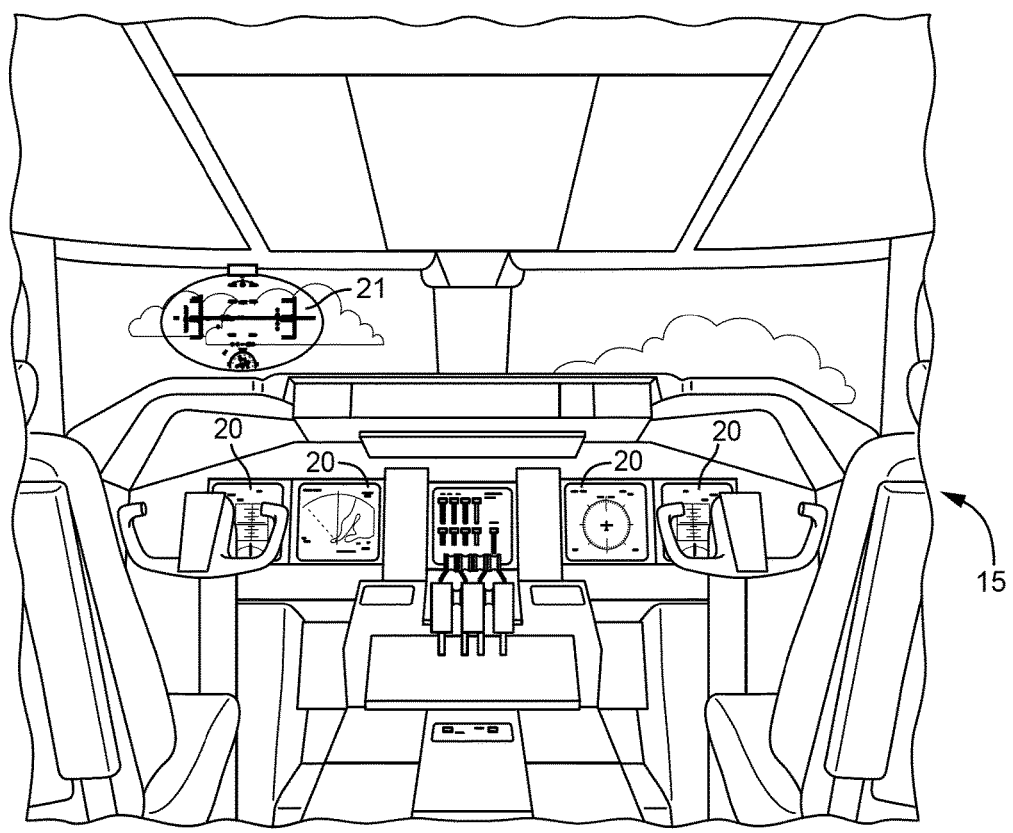
FIG. 3 is a perspective view illustration of a control center or cockpit for the aircraft illustrated in FIG. 2 including the vision system illustrated in FIG. 1, according to another exemplary embodiment.

With reference to FIG. 2, an aircraft 10 includes vision system 50. System 50 can include sensor 52 and an additional sensor 54 disposed at a different location on aircraft 10. Aircraft 10 can be any type of vehicle. Referring to FIG. 3, an illustration of a control center or cockpit 15 for aircraft 10 is shown, according to one exemplary embodiment. Aircraft control center 15 includes flight displays 20. Flight displays 20 can be used to provide information to the flight crew, thereby increasing visual range and enhancing decision-making abilities. Any of flight displays 20 can be utilized as display 58 for vision system 50 (FIG. 1).

In one exemplary embodiment, aircraft control center 15 includes a head up display (HUD) including a combiner 21 or a head worn display (e.g. a helmet mounted display (HMD) with or without a projector.) A display, such as display 58 (FIG. 1), can be configured to provide image content that is projected onto combiner 21. Combiner 21 is a generally transparent medium that the flight crew can see-through. The HUD is generally configured to display at least one of graphical and textual images or indicia and an EV image in one embodiment. Alternatively, the graphical and textual images or indicia and the EV image can be provided to any one or more of displays 20.

Figure 4:
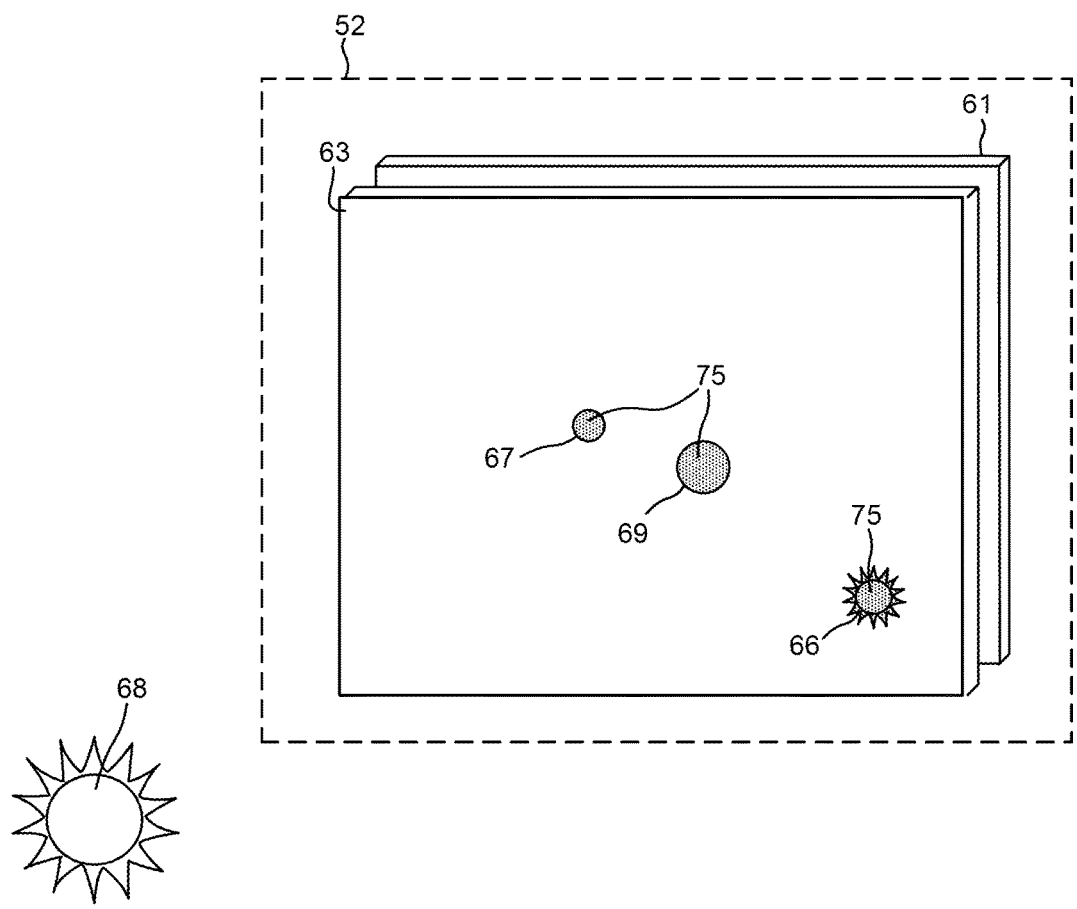
FIG. 4 is a perspective view schematic drawing of an embodiment of a focal plane array and photochromic layer exposed to sunlight for the vision system illustrated in FIG. 1 in accordance with an exemplary embodiment.

With reference to FIG. 4, sensor 52 includes focal plane array 61 and photochromic layer 63. Layers 63 and 61 can be arranged in a sandwich-like configuration.

Layer 63 and layer 61 are exposed to a solar disc 66 associated with sun 68. In addition, layers 63 and 61 can be exposed to other bright sources of light such as runway lights or other lights. Runway lights or other lights can provide bright light exposure at an area 67 and 69. As sun 68 and other sources of light streak across layer 63, layer 63 darkens as shown by darkened portion 75. Once bright lights and sun 68 are no longer exposed to surface of photochromic layer 63, layer 63 becomes transparent again. The darkened portion 75 protects focal plane array 61 from damage and saturation. With less saturation, imaging and shadow areas of the environment is improved by mitigating peak intensity.

Figure 5:
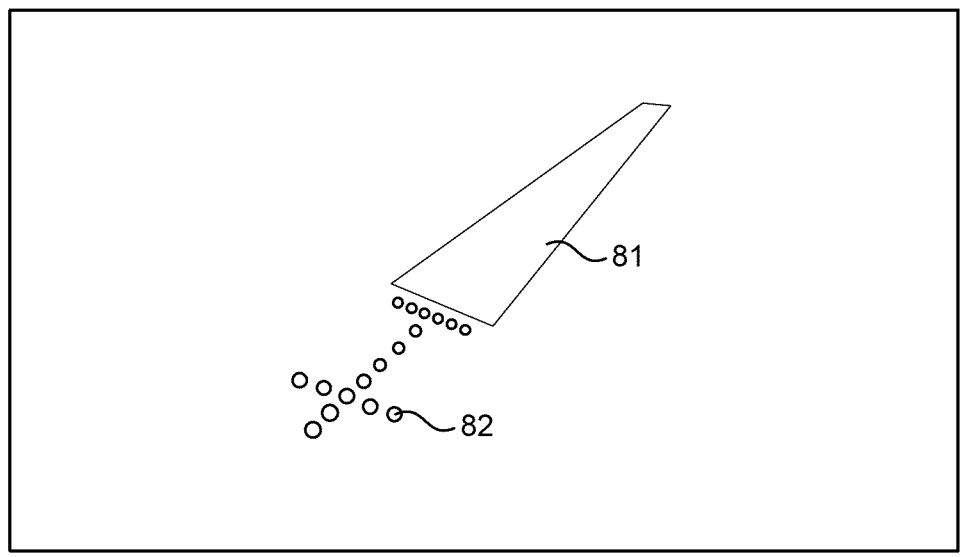
FIG. 5 is a perspective view schematic drawing of a focal plane array and photochromic layer exposed to a runway and approach light system for the vision system illustrated in FIG. 1 in accordance with an exemplary embodiment.
Figure 5:
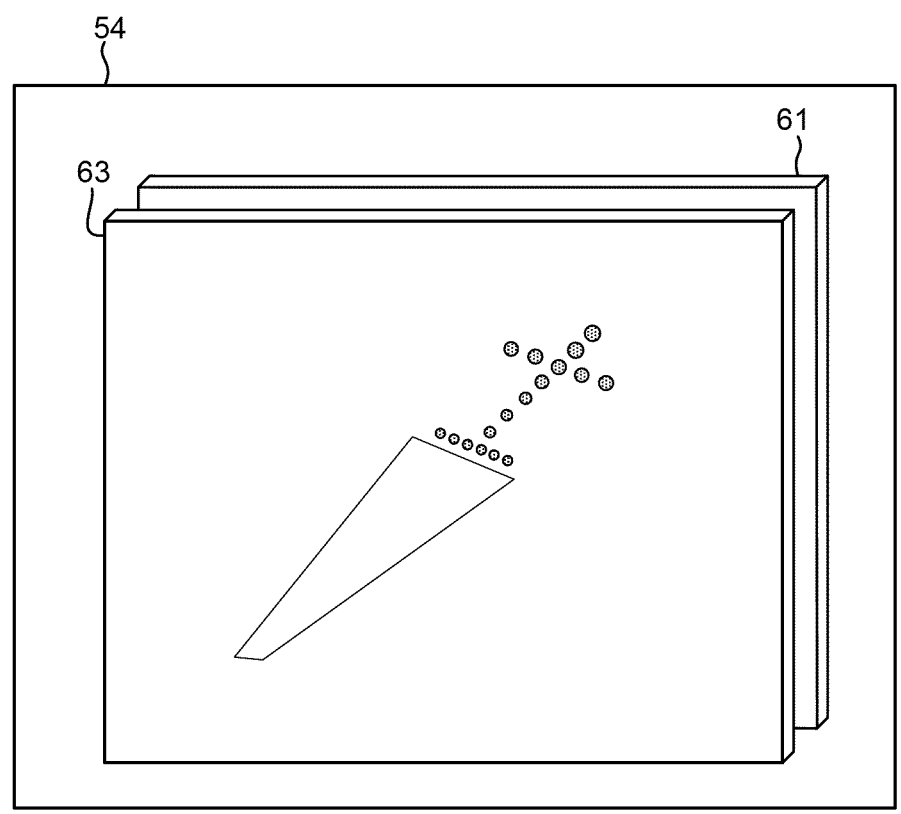

With reference to FIG. 5, sensor 52 is exposed to a runway 81 including an airport approach light system 82. Layer 61 receives the image associated with runway 81, as well as an image the bright lights associated with approach light system 82. Layer 63 is preferably configured with a short response time constant so that it reacts quickly to bright light sources from aircraft light system 82. Layer 63 darkens in response to the bright lights from system 82 and reduces radiation to improve images of the dimmer scene on focal plane array 61. For example, runway 81 is more visible when lights from system 82 do not saturate focal plane array 61. Once the bright lights no longer strike photochromic layer 63, layer 63 quickly recovers and becomes more transparent.

In one embodiment, processor 56 operates sensor 52 at a higher gain because layer 63 prevents lights from saturating array 61. The higher gain allows objects that would have otherwise been obscured by shadows.

The construction and arrangement of the systems and methods as shown in the various exemplary embodiments are illustrative only. Although only a few embodiments have been described in detail in this disclosure, many modifications are possible. All such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

It should be noted that although the figures may show a specific order of method steps, the order of the steps may differ from what is depicted. Also two or more steps may be performed concurrently or with partial concurrence.

What is claimed is:

1. An enhanced vision system, comprising:
   a lens;
   a sensor array; and
   a plurality of photochromic layers disposed in a sequential order, each photochromic layer disposed on a different plane between the lens and the sensor array, wherein a material of each photochromic layer of the plurality of photochromic layers is associated with a temporal response characteristic and a transmittance response characteristic;
   wherein, for each photochromic layer of the plurality of photochromic layers, the transmittance response characteristic is inversely proportional to an intensity of light received by the photochromic layer and proportional to a temperature of the photochromic layer; and
   wherein the temporal response characteristic corresponds to a type of light received by the plurality of photochromic layers.

2. The system of claim 1, wherein a first photochromic layer of the plurality of photochromic layers is a passive layer, and wherein the plurality of photochromic layers are arranged such that the first photochromic layer receives a ray of light before a second photochromic layer receives the ray of light, and wherein the first photochromic layer is disposed closer to the lens than the second photochromic layer.

3. The system of claim 2, wherein the first photochromic layer is configured to uniformly darken when exposed to an ambient light, and wherein a gain associated with the sensor array is higher due to the first photochromic layer being uniformly darkened.

4. The system of claim 1, wherein the system is operated in a high gain mode and a normal mode.

5. The system of claim 1, wherein a first photochromic layer of the plurality of photochromic layers has a first response sensor.

6. The system of claim 1, wherein the sensor array is a focal plane array.

7. The system of claim 1, wherein the transmittance response characteristic is associated with a thermal response of a photochromic material.

8. The system of claim 1, wherein the plurality of photochromic layers includes a first photochromic layer and a second photochromic layer, wherein the first photochromic layer has a first temporal response characteristic and a first transmittance response characteristic, wherein the second photochromic layer has a second temporal response characteristic and a second transmittance response characteristic, wherein the first temporal response characteristic and the first transmittance response characteristic are responsive to sunlight, and wherein the second temporal response characteristic and the second transmittance response characteristic are responsive to runway landing lights.

9. The system of claim 1, wherein the array is an infrared, or visible light array.

10. A method of protecting a focal plane sensor array from solar exposure, the method comprising:
- providing the focal plane sensor array; and
- providing a plurality of photochromic layers in front of the focal plane array, wherein the plurality of photochromic layers are disposed in a sequential order, each photochromic layer disposed on a different plane, wherein a material of each of the at least one photochromic layer is associated with a first temporal response characteristic and a first transmittance response characteristic;
- wherein the first transmittance response characteristic is inversely proportional to an intensity of light received by the at least one photochromic layer and proportional to a temperature of the at least one photochromic layer; and
- wherein the first temporal response characteristic is based on the type of light received by the at least one photochromic layer.

11. The method of claim 10, wherein the at least one photochromic layer is a passive layer.

12. The method of claim 10, further comprising: providing at least one other photochromic layer associated with a second temporal response characteristic and a second transmittance response characteristic.

13. The method of claim 10, wherein the focal plane array is part of a camera.

14. The method of claim 10, wherein the temporal response characteristic responds and recovers from solar disc exposure in the range of a microsecond or faster.

15. The method of claim 10, wherein at least one response characteristic corresponds to a response and recovery constant optimized for a given application.

16. The method of claim 10, wherein the focal plane sensor array operates at a higher gain due to the use of the at least one photochromic layer.

17. A camera, comprising:
- a sensor array;
- a first photochromic layer having a first material associated with a first temporal response characteristic and a first transmittance response characteristic in response to receiving a first type of light; and
- a second photochromic layer having a second material associated with a second temporal response characteristic and a second transmittance response characteristic in response to receiving a second type of light;
- wherein the first photochromic layer and the second photochromic layer are disposed in front of the sensor array in a sequential order with each photochromic layer disposed on a different plane.

18. The camera of claim 17, wherein the first photochromic layer is a passive polymer film or glass layer.

19. The camera of claim 17, wherein the first photochromic layer includes silverhalides.

20. The camera of claim 17, wherein the first photochromic layer has a response recovery time in the order of microseconds.

* * * * *